UNITED STATES PATENT OFFICE.

ROBERT DEMUTH, OF ELBERFELD, GERMANY, ASSIGNOR TO THE FARBEN-FABRIKEN OF ELBERFELD COMPANY, OF NEW YORK.

INDIGO-BLUE COTTON-DYE.

SPECIFICATION forming part of Letters Patent No. 611,611, dated October 4, 1898.

Application filed January 20, 1898. Serial No. 667,310. (Specimens.)

*To all whom it may concern:*

Be it known that I, ROBERT DEMUTH, doctor of philosophy and chemist, residing at Elberfeld, Germany, (assignor to the FARBEN-FABRIKEN OF ELBERFELD COMPANY, of New York,) have invented a new and useful Improvement in the Manufacture of Indigo-Blue Cotton-Dye; and I do hereby declare the following to be an exact and clear description thereof.

My invention relates to the production of a new indigo-blue cotton dye-stuff by subjecting 1.8 amidonaphthol to the action of an alkaline sulfid carrying compound at elevated temperatures and subsequently treating the resulting melt in a suitable manner, in order to isolate therefrom the blue dye, which isolation may be effected by repeatedly treating the melt with small quantities of hot water, filtering off the solutions thus formed, continuing this extraction, until the blue dye contained in the melt has been wholly dissolved out, and finally precipitating from the resulting filtrates the blue dye with common salt, zinc-chlorid, zinc ammonium chlorid or the like. The product thus obtained dyes unmordanted cotton in alkaline baths indigo blue shades which are fast against the action of alkalies and light and yields the same shades when it is dyed in hot or cold baths containing suitable reducing agents. On using hot baths alkaline sulfid or alkaline carbonate and grape sugar may be profitably employed as reducing agents, while in the case of using cold baths alkaline sulfid is used with preference.

In order to carry out my process practically I can proceed as follows without limiting myself to the details given:

Fifty parts, by weight, of the sulfuric acid salt of 1.8 amidonaphthol are stirred into a hot solution prepared from ninety parts, by weight, of dry sodium sulfid one hundred and twenty-five parts, by weight, of flowers of sulfur and eighty parts by weight, of water.

The resulting mixture is slowly heated in an iron vessel profitably by means of a metallic bath to 200° centigrade (temperature of the bath) taking care that the mass is well stirred and keeping the same at the said temperature until it has become solid and can be easily minced to form a powdery mass. At this stage the vessel is closed, the temperature of the bath is raised to 240° centigrade and heating is continued say for about two hours until test portions of the melt dissolve in water with a bright indigo-blue color and the intensity of the coloration thus obtained does no longer increase.

After cooling the blackish powdery melt is taken out from the vessel and repeatedly treated with small quantities of hot water, the resulting solutions are poured on a filter and this extraction of the melt is continued, until the blue dye is wholly dissolved out. From the joint filtrates the blue dye is precipitated by means of a watery solution of zinc chlorid. When filtered off, pressed, dried and powdered it forms a blackish powder insoluble in water, sodium carbonate solution and hydrochloric acid of 21° Baumé, for the most part soluble in soda lye (40° Baumé) with a bluish color, in concentrated sulfuric acid (66° Baumé) with a dull bluish-red color, and in hot watery solutions of sodium sulfid with a brownish color turning into blue at exposure to the air. It dyes unmordanted cotton in alkaline baths indigo blue shades which are fast against the action of alkalies and light and yields the same shades when it is dyed in boiling baths containing sodium sulfid, or sodium carbonate and grape sugar, or when it is dyed in cold baths containing sodium sulfid or the like.

The process proceeds in an analogous manner if in place of sulfur and sodium sulfid used in the above example other alkaline sulfid carrying compounds such as sulfur and potassium sulfid, sulfur and soda, sulfur and potassa, sodium polysulfid, potassium polysulfid or the like are employed, or if a corresponding quantity of the 1.8 amidonaphthol itself is used in place of the sulfuric acid salt of 1.8 amidonaphthol prescribed in the above example.

Having now described my invention and in what manner the same is to be performed, what I claim as new, and desire to secure by Letters Patent, is—

1. The process for the production of a new indigo-blue cotton dye from 1.8 amidonaphthol, which process consists in subjecting 1.8 amidonaphthol to the action of an alkaline sulfid and sulfur at elevated temperatures, repeatedly extracting the resulting melt when cold with small quantities of hot water, until the blue dye is wholly dissolved out and finally isolating from the joint filtrates the dye by precipitation with a metallic chlorid, such as zinc chlorid, substantially as hereinbefore described.

2. As a new article of manufacture the indigo blue cotton dye derived from 1.8 amidonaphthol forming when precipitated by means of zinc chlorid, dried and pulverized a blackish powder, insoluble in water, sodium carbonate solution and hydrochloric acid (21° Baumé) for the most part soluble in soda-lye (40° Baumé) with a bluish color, in concentrated sulfuric acid (66° Baumé) with a dull bluish-red color, and in hot watery solutions of sodium sulfid with a brownish color turning into blue at exposure to the air, producing on unmordanted cotton in alkaline baths and in baths containing suitable reducing agents indigo blue shades fast to the action of alkalies and light, substantially as hereinbefore described.

In testimony whereof I have signed my name in the presence of two subscribing witnesses.

ROBERT DEMUTH.

Witnesses:
R. E. JAHN,
OTTO KÖNIG.